(12) United States Patent
Yoshida et al.

(10) Patent No.: US 12,019,247 B2
(45) Date of Patent: Jun. 25, 2024

(54) HEAD-MOUNTED DISPLAY

(71) Applicant: SONY CORPORATION, Tokyo (JP)

(72) Inventors: Takaaki Yoshida, Tokyo (JP); Hideki Takahashi, Kanagawa (JP); Teppei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 663 days.

(21) Appl. No.: 17/250,377

(22) PCT Filed: Jun. 26, 2019

(86) PCT No.: PCT/JP2019/025495
§ 371 (c)(1),
(2) Date: Jan. 13, 2021

(87) PCT Pub. No.: WO2020/021951
PCT Pub. Date: Jan. 30, 2020

(65) Prior Publication Data
US 2021/0325681 A1    Oct. 21, 2021

(30) Foreign Application Priority Data

Jul. 24, 2018    (JP) .............................. 2018-138632

(51) Int. Cl.
*G02B 27/01*    (2006.01)
*F16M 13/04*    (2006.01)

(52) U.S. Cl.
CPC .. *G02B 27/0176* (2013.01); *G02B 2027/0169* (2013.01)

(58) Field of Classification Search
CPC ........................... G02B 27/0176; F16M 13/04
See application file for complete search history.

(56) References Cited

U.S. PATENT DOCUMENTS

| | | | |
|---|---|---|---|
| 10,078,349 B1 * | 9/2018 | Morris | ............... G02B 27/0176 |
| 10,095,038 B1 * | 10/2018 | Hsu | ................... G02B 27/0176 |
| 2002/0008677 A1 | 1/2002 | Saito | |
| 2004/0003453 A1 | 1/2004 | Uragawa et al. | |
| 2018/0027676 A1 | 1/2018 | Araki et al. | |

FOREIGN PATENT DOCUMENTS

| | | |
|---|---|---|
| CN | 101738140 A | 6/2010 |
| CN | 203618852 U | 6/2014 |
| CN | 203762362 U | 8/2014 |
| CN | 106105183 A | 11/2016 |

(Continued)

OTHER PUBLICATIONS

International Search Report and Written Opinion of PCT Application No. PCT/JP2019/025495, dated Sep. 17, 2019, 09 pages of ISRWO.

*Primary Examiner* — Ryan D Howard
(74) *Attorney, Agent, or Firm* — CHIP LAW GROUP

(57) ABSTRACT

A head-mounted display (10) according to the present disclosure, includes: a front block (100) that supports a display unit to be disposed in front of an eye of a user; a rear block (300) that is to be disposed on a back side of a head of the user; and a plurality of elastic bodies (230, 340) that extend along a belt for linking the front block (100) to the rear block (300). Each of the plurality of elastic bodies (230, 240) has one end fixed to the belt and another end fixed to a predetermined position in the rear block (300).

12 Claims, 9 Drawing Sheets

(56) References Cited

FOREIGN PATENT DOCUMENTS

| | | |
|---|---|---|
| CN | 205899153 U | 1/2017 |
| CN | 106455737 A | 2/2017 |
| CN | 107251547 A | 10/2017 |
| CN | 207020394 U | 2/2018 |
| CN | 207037227 U | 2/2018 |
| EP | 3264748 A1 | 1/2018 |
| JP | 11-298826 A | 10/1999 |
| JP | 2002-044566 A | 2/2002 |
| JP | 2004-040354 A | 2/2004 |
| WO | 2016/136657 A1 | 9/2016 |

* cited by examiner

[FIG. 1]
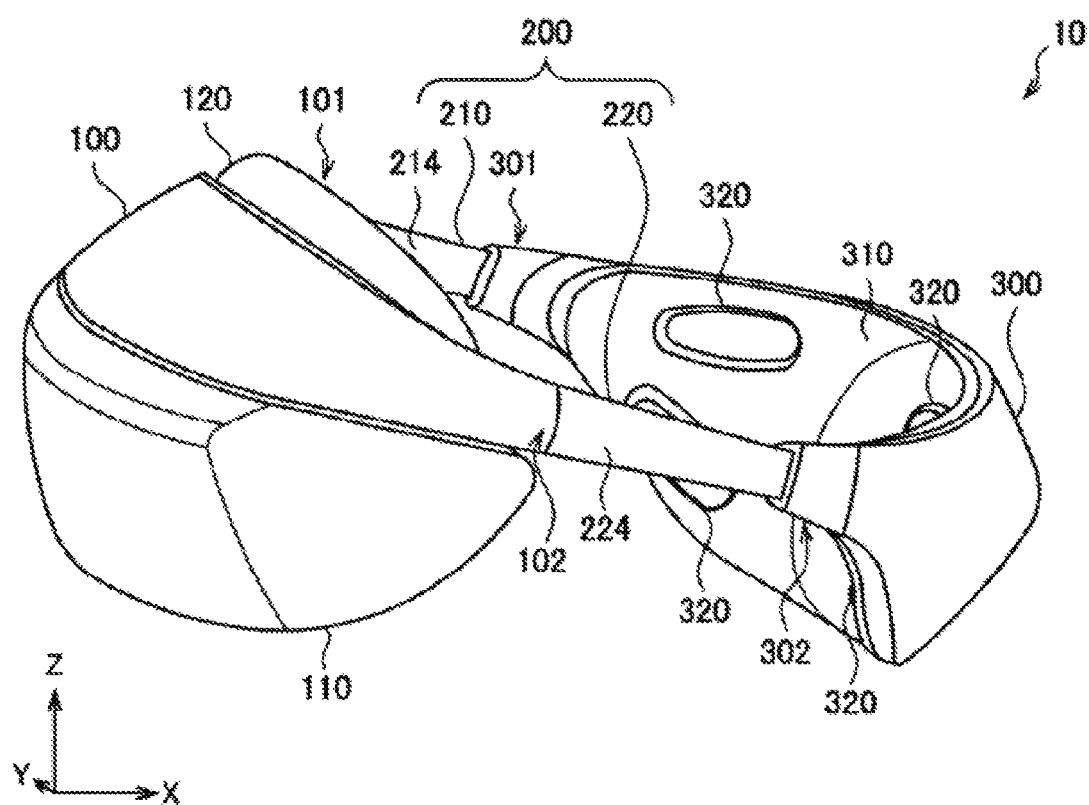

[FIG. 2]
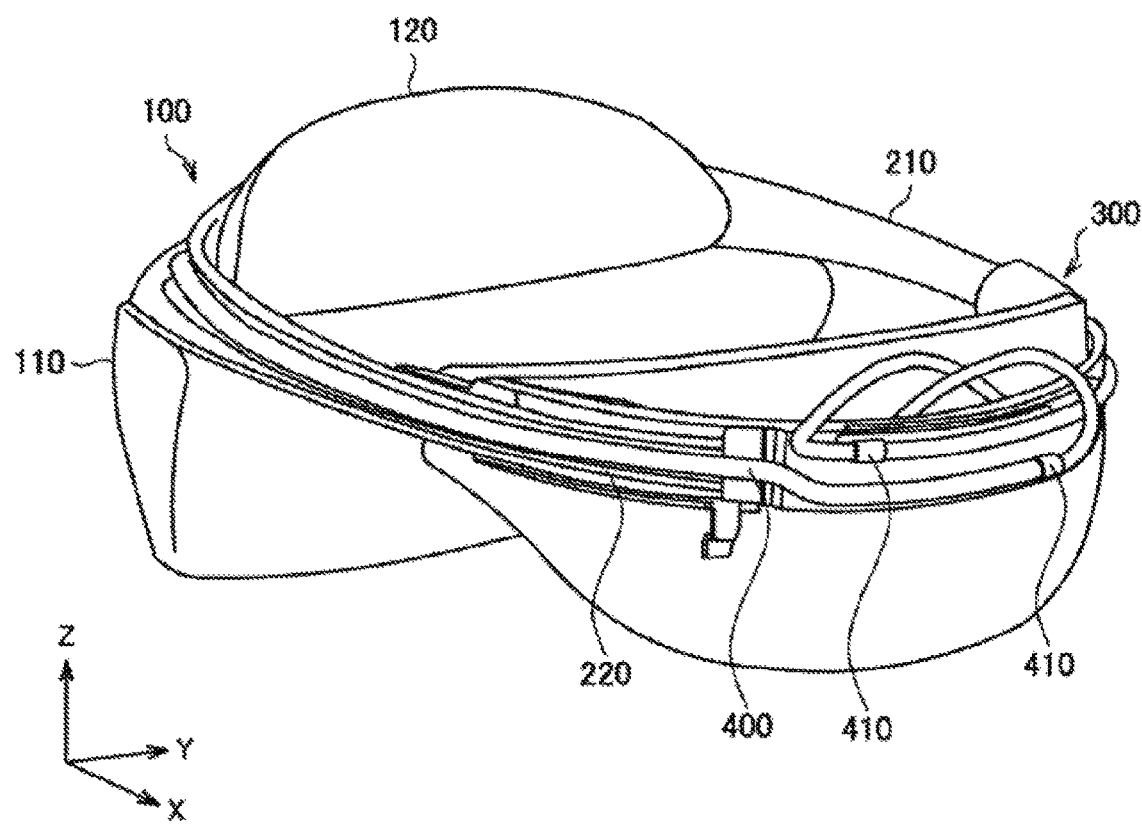

[FIG. 3]
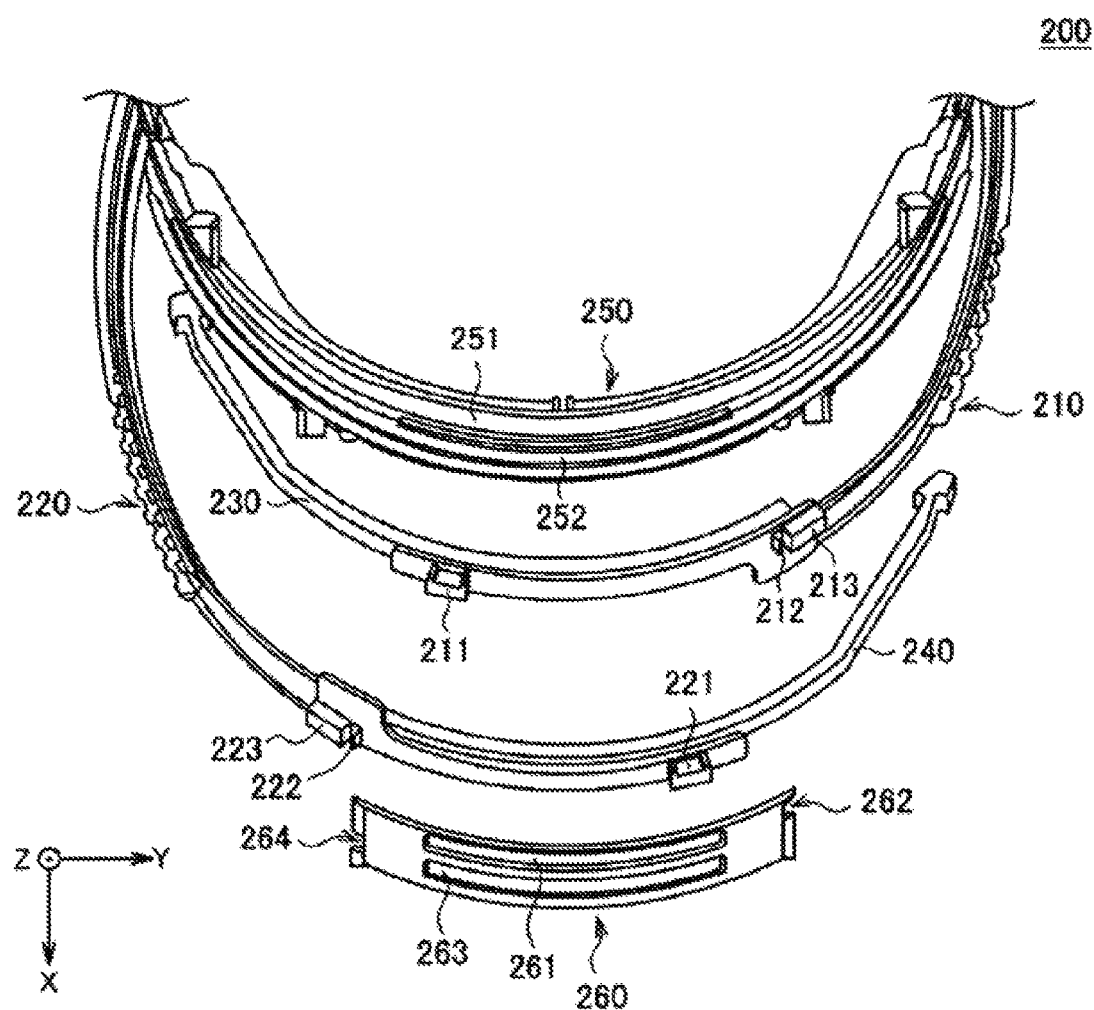

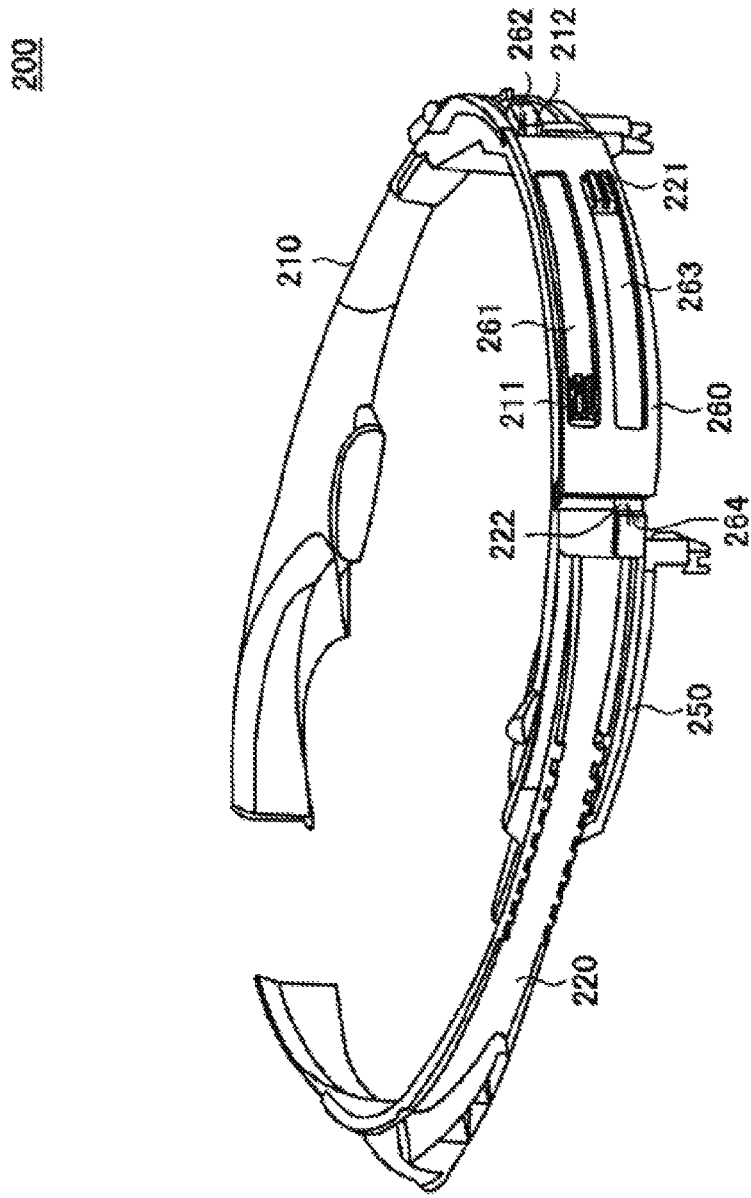
[FIG. 4]

[FIG. 5]
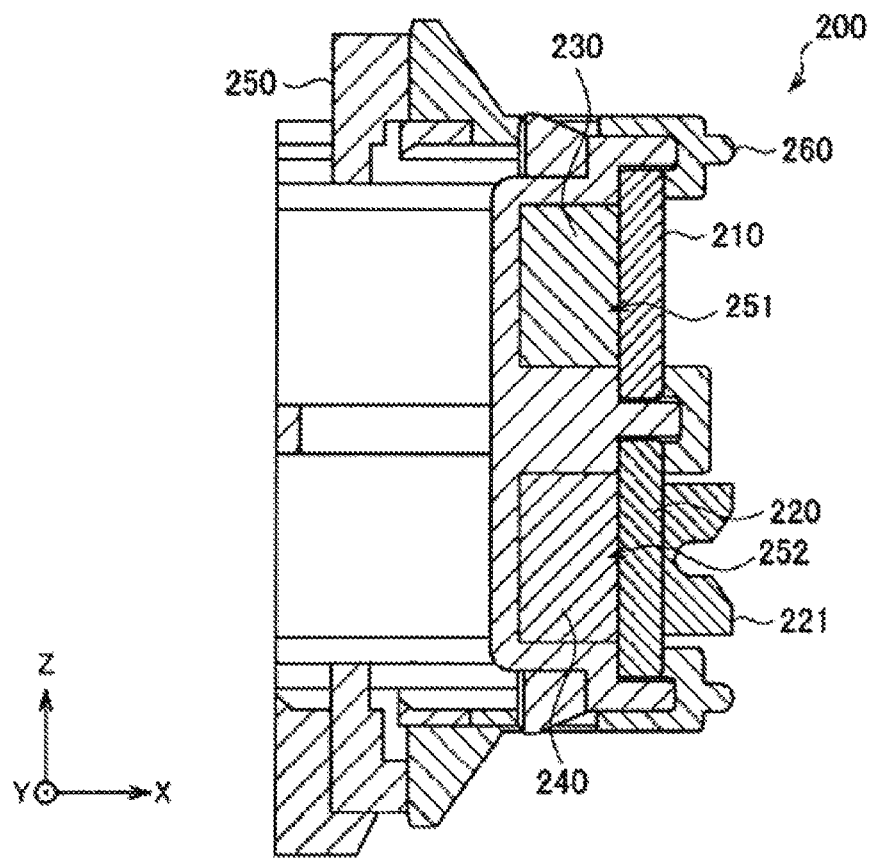
[FIG. 6]
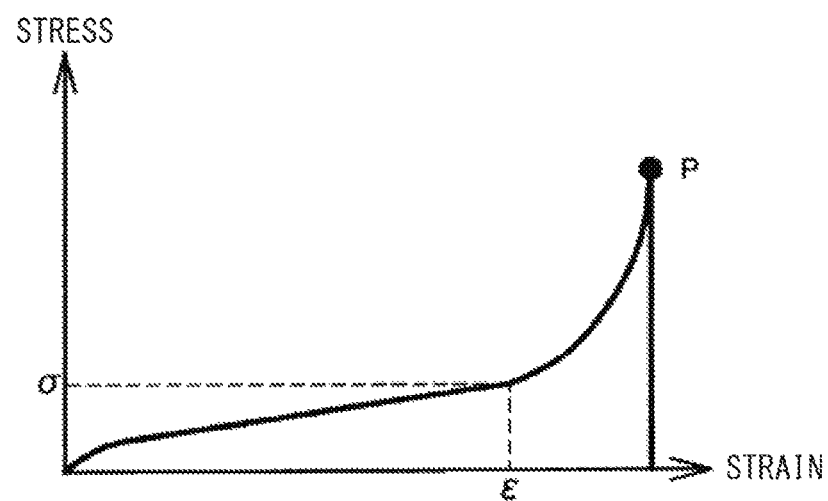

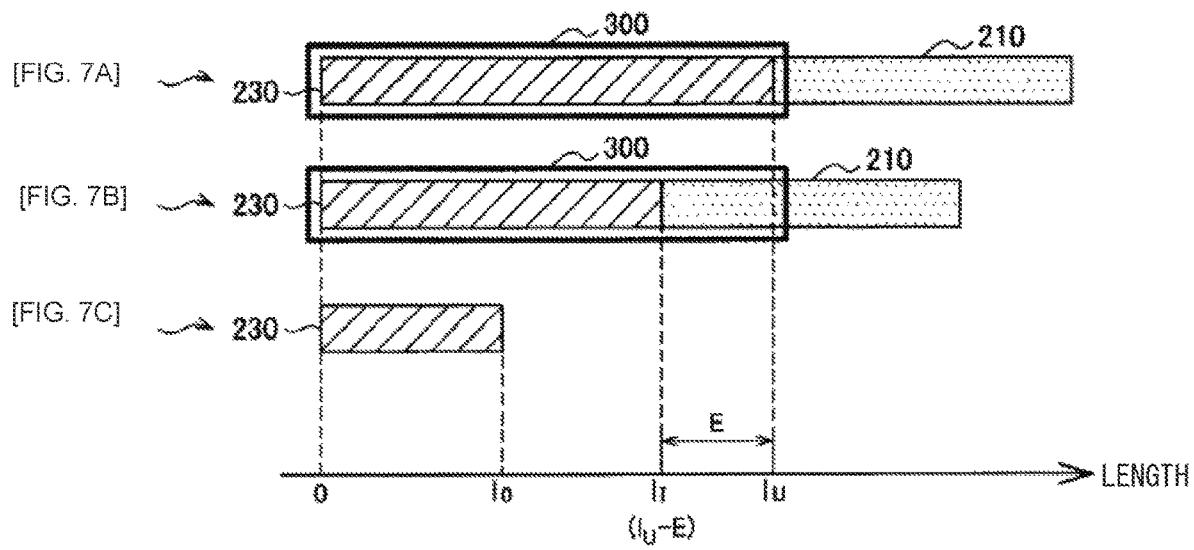
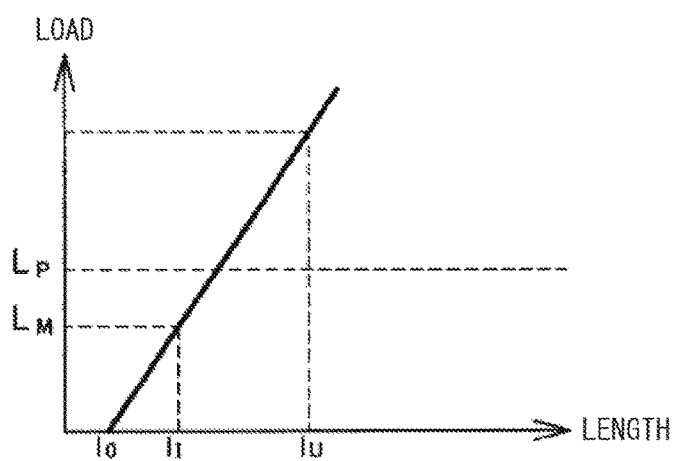

[FIG. 9]
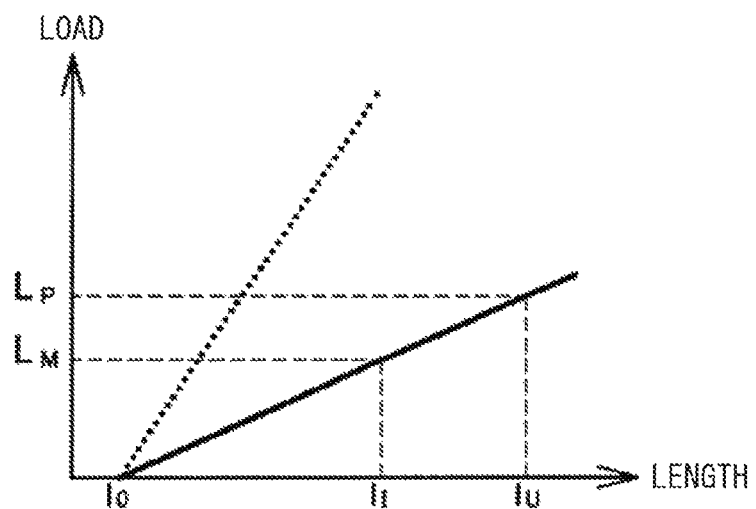
[FIG. 10]
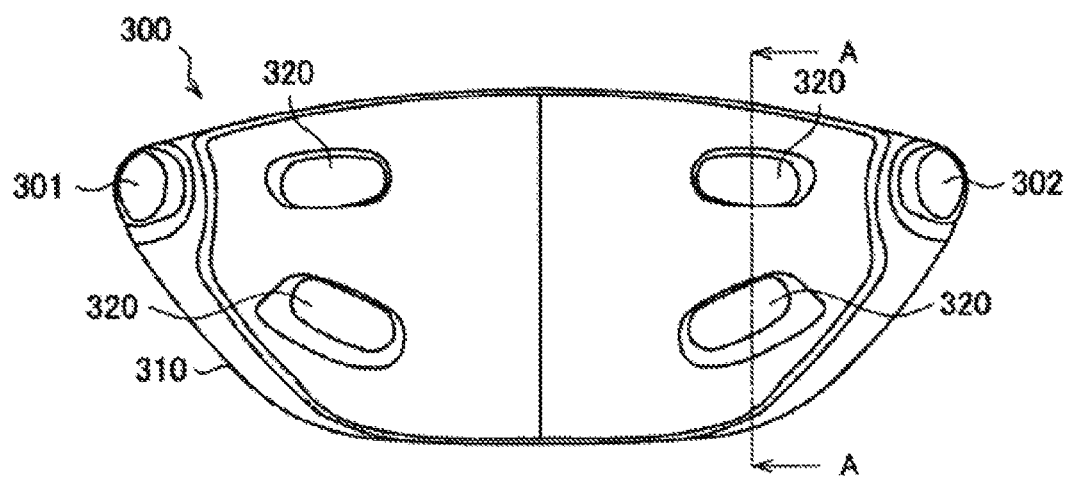

[FIG. 11]
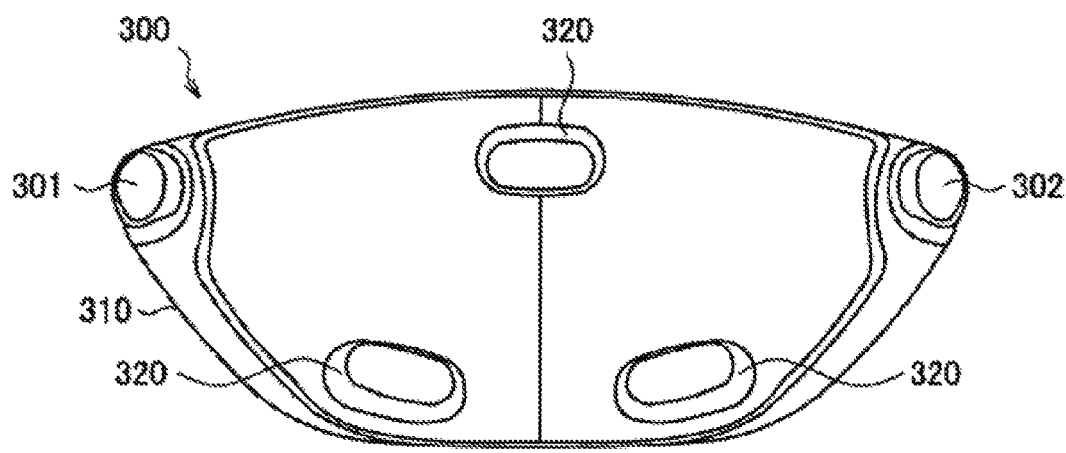
[FIG. 12]
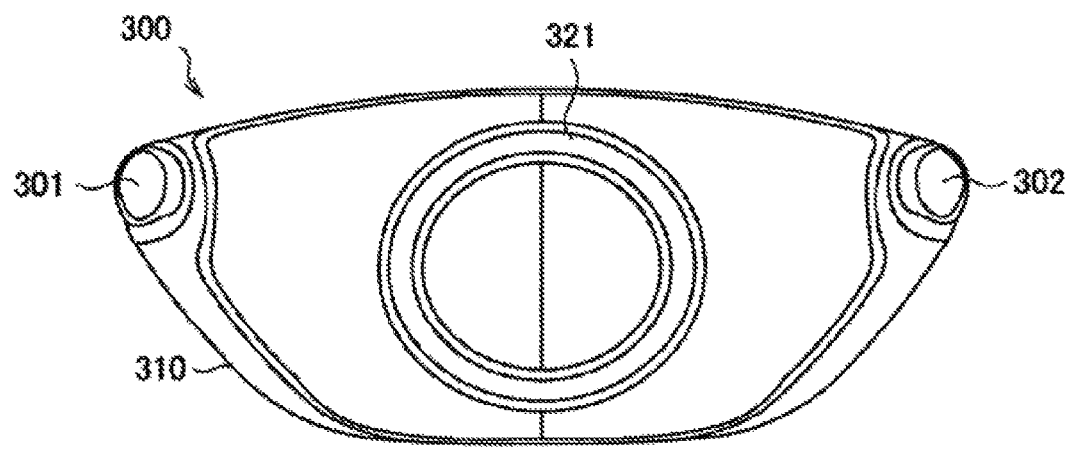

[FIG. 13]
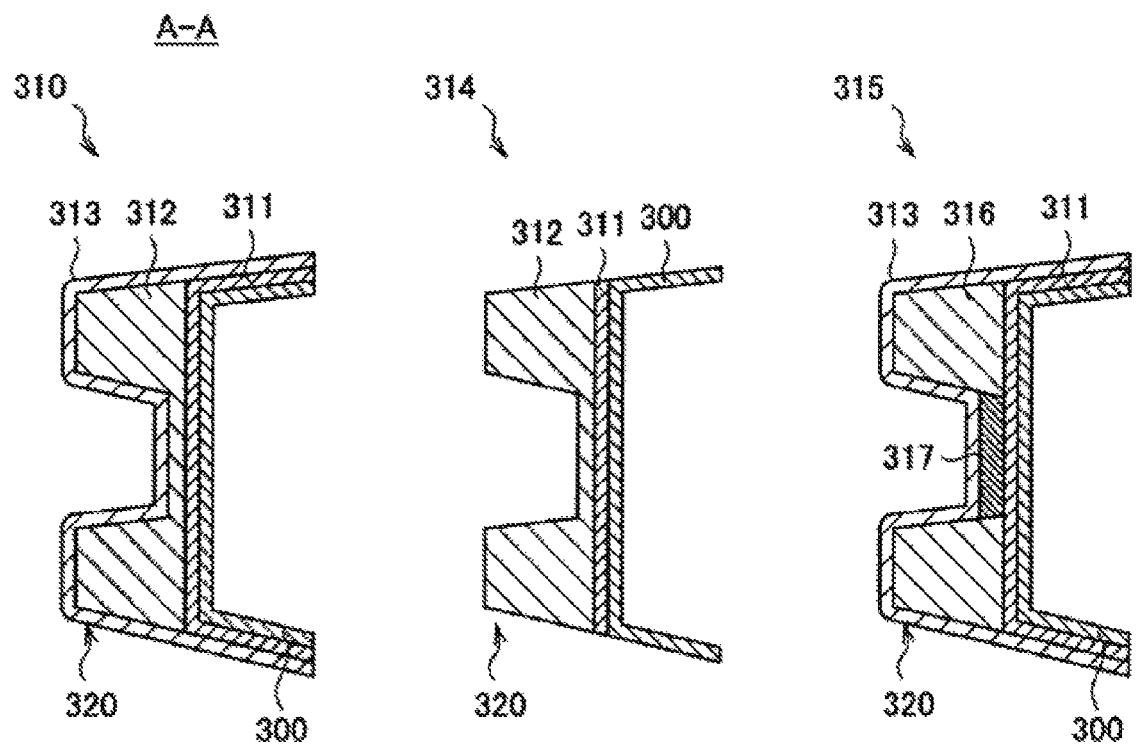
[FIG. 14]
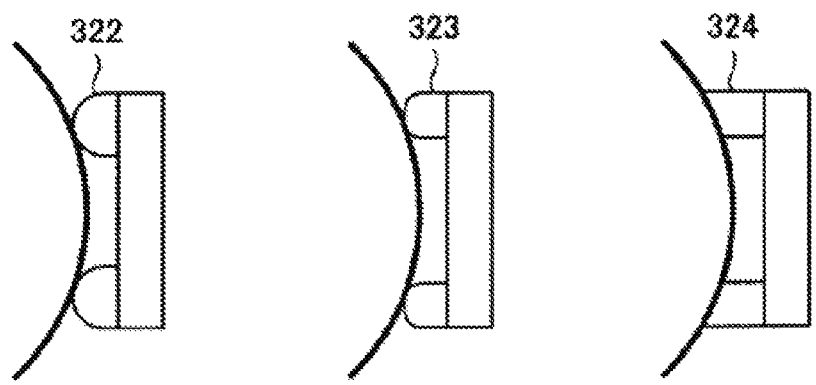

US 12,019,247 B2

HEAD-MOUNTED DISPLAY

CROSS REFERENCE TO RELATED APPLICATIONS

This application is a U.S. National Phase of International Patent Application No. PCT/JP2019/025495 filed on Jun. 26, 2019, which claims priority benefit of Japanese Patent Application No. JP 2018-138632 filed in the Japan Patent Office on Jul. 24, 2018. Each of the above-referenced applications is hereby incorporated herein by reference in its entirety.

TECHNICAL FIELD

The present disclosure relates to a head-mounted display.

BACKGROUND ART

In recent years, head-mounted displays (HMDs) have been developed. The head-mounted display is worn on the head of a user in use. Examples of the head-mounted displays include a head-mounted display to be worn on the user's head via a wearing unit such as a head band, a glasses-type head-mounted display to be supported by the nose and ears of a user, and the like.

Some of the head-mounted displays include a wearing unit provided with a mechanism for adjusting the length of the wearing unit, for example. Such a head-mounted display allows the user to adjust the length of a wearing band to the size of the user's head. This makes it possible to stably wear the head-mounted display on the user's head. For example, PTL 1 listed below discloses a head-mounted display provided with a wearing band. The length of the wearing band is adjustable by a locking mechanism provided on the wearing band.

CITATION LIST

Patent Literature

PTL 1: WO 2016/136657

SUMMARY OF THE INVENTION

Problems to be Solved by the Invention

However, the above-described locking mechanism provided on the head-mounted display disclosed in PTL 1 has a complicated structure. Therefore, a user interface is also complicated, and sometimes a user feels that adjustment of the length of the wearing band is cumbersome.

Accordingly, the present disclosure proposes a head-mounted display that provides comfortable wearability and higher convenience for the user.

Means for Solving the Problem

According to the present disclosure, there is provided a head-mounted display including: a front block that supports a display unit to be disposed in front of an eye of a user; a rear block that is to be disposed on a back side of a head of the user; and a plurality of elastic bodies that extends along a belt for linking the front block to the rear block. Each of the plurality of elastic bodies has one end that is fixed to the belt and another end that is fixed to a predetermined position in the rear block.

According to the present disclosure, each of the plurality of elastic bodies is fixed to the belt at one end and is fixed to a predetermined position in the rear block at another end with being stretched. This makes it possible to change the size of the head-mounted display.

Effects of the Invention

As described above, according to the present disclosure, it is possible to provide the head-mounted display that provides comfortable wearability and higher convenience for the user.

It is to be noted that the above-described effects are not necessarily limitative. In addition to or in place of the above effects, there may be achieved any of the effects described in the present specification or other effects that may be grasped from the present specification.

BRIEF DESCRIPTION OF THE DRAWINGS

FIG. 1 is a perspective view of a head-mounted display according to an embodiment of the present disclosure.

FIG. 2 is a schematic diagram for describing a configuration of the head-mounted display according to the embodiment.

FIG. 3 is a schematic diagram for describing a structure of an adjustment mechanism according to the embodiment.

FIG. 4 is a schematic diagram illustrating the structure of the adjustment mechanism according to the embodiment.

FIG. 5 is a schematic diagram illustrating a cross section of the adjustment mechanism according to the embodiment, the cross section being taken along a plane parallel to a ZX plane.

FIG. 6 is a graph illustrating an example of a stress-strain relationship of rubber used as elastic bodies.

FIGS. 7A, 7B, and 7C are schematic diagrams for describing a method of designing the adjustment mechanism according to the embodiment.

FIG. 8 is a graph illustrating a load-extension relationship of an elastic body having a large Young's modulus.

FIG. 9 is a graph illustrating a load-extension relationship of an elastic body having a small Young's modulus.

FIG. 10 is a schematic diagram illustrating a structure of a pad member according to the embodiment.

FIG. 11 is a schematic diagram illustrating a structure of a pad member provided with projections whose position or structure is different according to the embodiment.

FIG. 12 is a schematic diagram illustrating a structure of a pad member provided with a projection whose position or structure is different according to the embodiment.

FIG. 13 is a schematic diagram illustrating cross sections of the pad members according to the embodiment, the cross sections being taken along a line A-A of FIG. 10.

FIG. 14 is a schematic diagram for describing shapes of the projections according to the embodiment.

MODES FOR CARRYING OUT THE INVENTION

Hereinafter, preferred embodiments of the present disclosure are described in detail with reference to the appended drawings. It is to be noted that, in the present specification and drawings, repeated description is omitted for components substantially having the same functional configuration by assigning the same reference numerals.

It is to be noted that, the description is given in the following order.

<1. Configuration of Head-Mounted Display>
<2. Configuration of Adjustment Mechanism>
<3. Design of Adjustment Mechanism>
<4. Pad Member>
<5. Conclusion>

1. CONFIGURATION OF HEAD-MOUNTED DISPLAY

First, with reference to FIG. 1 to FIG. 3, a configuration of a head-mounted display 10 according to the present disclosure is described. FIG. 1 is a perspective view of the head-mounted display 10 according to an embodiment of the present disclosure. FIG. 2 is a schematic diagram for describing the configuration of the head-mounted display of the head-mounted display 10 according to the present embodiment. FIG. 2 illustrates an internal space of a rear block 300. FIG. 3 is a schematic diagram for describing a structure of an adjustment mechanism 200 according to the present embodiment.

The head-mounted display 10 according to the present embodiment is mounted on the head of a user in use. The head-mounted display 10 includes a front block, a rear block, and a plurality of elastic bodies. The front block supports a display unit to be disposed in front of the eyes of the user. The rear block is to be disposed on a back side of the user's head. The plurality of elastic bodies extends along belts that links the front block to the rear block. As described later, each of the plurality of elastic bodies has one end that is fixed to the belt and another end that is fixed to a predetermined position in the rear block. For example, as illustrated in FIG. 1, the head-mounted display 10 may include a front block 100, a first belt 210, a second belt 220, and the rear block 300. The head-mounted display 10 is worn on the user's head, for example, in a state in which the user's head is surrounded by the front block 100, the first belt 210, the second belt 220, and the rear block 300.

In the following description, a direction in which the front block 100 and the rear block 300 of the head-mounted display 10 are disposed to sandwich the user's head is referred to as an X-axis direction. Here, a direction from the front block 100 to the rear block 300 along the X-axis direction is deemed to be a positive direction of the X axis. In addition, two respective directions that are orthogonal to each other in a plane perpendicular to the X-axis direction are referred to as a Y-axis direction and a Z-axis direction. In this case, the Z-axis direction is a direction corresponding to the height of the user.

The front block 100 is disposed in such a manner that the user's head is sandwiched between the front block 100 and the rear block 300 in a front-rear direction. The front block 100 supports a display unit 110 for displaying various kinds of images and information for the user. In addition, the front block 100 includes a front pad 120 to be disposed on a user's head side (the X axis positive direction side) for supporting the user's head. In addition, the front block 100 includes a substrate (not illustrated) related to the display unit 110 therein.

The display unit 110 is supported by the front block 100 in such a manner that the display unit 110 is positioned in front of the eyes of the user. The display unit 110 has a function of displaying various kinds of images and information for the user. The display unit 110 may be a transparent display or a non-transparent display. The transparent display does not block the field of view of the user in a state in which no image is displayed. In addition, the display unit 110 may be disposed in front of both of the eyes of the user or one of the eyes of the user. The front block 100 may include a camera (not illustrated) for capturing an image of the field of view of the user corresponding to a direction of a face of the user who is wearing the head-mounted display.

The front pad 120 is disposed on the user's head side of the front block 100 so as to abut on the user's head. The front pad 120 includes, for example, foamable resin. Specifically, foamable urethane resin may be used. It is to be noted that material used for the front pad 120 is not limited to the foamable urethane resin. It is also possible to use felt, rubber, or polyester fiber.

The first belt 210 links one end of the front block 100 to an end of the rear block 300 corresponding to the one end of the front block 100. Specifically, as illustrated in FIG. 1, the first belt 210 extends from a first side end 101 of the front block 100 in the rear direction (X-axis direction), and the first belt 210 extending in the rear direction is coupled to a first side end 301 of the rear block 300. For more details, the first belt 210 extending from the first side end 101 in the rear direction further extends from the first side end 301 of the rear block 300 into the internal space of the rear block 300. In addition, as illustrated in FIG. 3, the first belt 210 is provided with a first protrusion 211 (described later), for example. The first protrusion 211 is provided at an end of the first belt 210 on a surface opposite to a surface on the user's head side. In addition, the first belt 210 is provided with a second protrusion 212 (described later). The second protrusion 212 is provided at a predetermined position on the surface of the first belt 210 opposite to the surface on the user's head side.

The second belt 220 links another end of the front block 100 and another end of the rear block 300 so as to be opposed to the first belt 210. Specifically, as illustrated in FIG. 1, the second belt 220 extends from a second side end 102 of the front block 100 in the rear direction. The second side end 102 is positioned on the opposite side from the first side end in the Y-axis direction. The second belt 220 extending from the second side end 102 in the rear direction is coupled to a second side end 302 of the rear block 300. For more details, the second belt 220 extending from the second side end 102 in the rear direction further extends from the second side end 302 of the rear block 300 into the internal space of the rear block 300. In addition, as illustrated in FIG. 3, the second belt 220 is provided with a third protrusion 221 (described later), for example. The third protrusion 221 is provided at an end of the second belt 220 on a surface opposite to a surface on the user's head side. In addition, the second belt 220 is provided with a fourth protrusion 222 (described later). The fourth protrusion 222 is provided at a predetermined position on the surface of the second belt 220 opposite to the surface on the user's head side.

As illustrated in FIG. 3, the adjustment mechanism 200 for adjusting the size of the head-mounted display 10 includes the first belt 210, the second belt 220, a first elastic body 230, a second elastic body 240, a rail 250, and a rail cover 260 (described later). The first belt 210 and the second belt 220 are slidable on the rail 250 (described later). In addition, as described later, the first elastic body 230 and the second elastic body 240 are also slidable on the rail 250.

As illustrated in FIG. 2, the first belt 210 and the second belt 220 support a cable 400. The cable 400 couples, for example, the substrate related to the display unit 110 to a substrate for controlling operation of the head-mounted display 10. The substrate related to the display unit 110 is provided in the internal space of the front block 100. The substrate for controlling operation of the head-mounted display 10 is provided in the internal space of the rear block 300. In addition, each of the first belt 210 and the second belt 220 may be provided with a belt cover that covers the cable 400. For example, a first belt cover 214 may be disposed so as to fit the first belt 210. In addition, for example, a second belt cover 224 may be disposed so as to fit the second belt 220. It is to be noted that the method of attaching the first belt 210 and the second belt 220 is not limited thereto as long as the front block 100 and the rear block 300 are linked and the front block 100, the first belt 210, the second belt 220, and the rear block 300 are worn on the user's head.

It is possible to manufacture the first belt 21 and the second belt 220 through various known methods by using various known materials. For example, the first belt 21 and the second belt 220 may be manufactured through injection molding by using thermoplastic resin as the material.

The rear block 300 is disposed on the back side of the user's head. The rear block 300 includes a rear pad 310 to be disposed on the user's head side for supporting the user's head. The rear block 300 may include the rail 250. The rail 250 may be provided in the internal space of the rear block 300, for example. In addition, the rear block 300 may further include a rail cover that is opposed to the rail across at least the belt or any of the plurality of elastic bodies, the rail cover defining an amount of elongation of the elastic body. For example, as illustrated in FIG. 3 to FIG. 5, the rear block 300 includes the rail cover 260 that is opposed to the rail 250 across at least any of the first belt 210, the second belt 220, the first elastic body 230, or the second elastic body 240.

Examples of the material for the rear block 300 may include resin material, metal material, and the like. Specifically, polycarbonate, acetylcellulose, aluminium alloy, titanium alloy, metal-material stainless steel, or the like may be used.

In addition, as described above, the substrate (not illustrated) that controls operation of the head-mounted display is provided in the internal space of the rear block 300. The substrate provided in the internal space of the rear block 300 is coupled to the substrate provided in the internal space of the front block 100 via the cable 400. For example, as illustrated in FIG. 2, the rear block 300 may be provided with a fixing member 410 disposed at a predetermined position. It is possible for the fixing member 410 to fix a portion of the cable 400 in such a manner that the cable 400 is prevented from sagging in the internal space of the rear block 300. For example, the fixing member 410 may be attached to the first belt 210 and the second belt 220. Specifically, for example, the fixing member 410 may be attached to the first protrusion 211 and the third protrusion 221 illustrated in FIG. 3 and FIG. 4.

The rear pad 310 is disposed on the user's head side of the rear block 300 so as to abut on the user's head. The rear pad 310 includes, for example, foamable resin. Specifically, foamable urethane resin may be used. It is to be noted that material used for the rear pad 310 is not limited to the foamable urethane resin. Felt, rubber, or polyester fiber may be used.

In addition, the rear pad 310 is provided with a projection 320 on its opposing surface to be opposed to the back side of the user's head. The projection 320 abuts on the user's head in a region other than a region corresponding to a backmost part of the user's head. Details of the rear pad 310 are described in <4. Pad Member> later. It is to be noted that, the rear pad 310 corresponds to the "pad member" according to the present disclosure.

2. CONFIGURATION OF ADJUSTMENT MECHANISM

The schematic configuration of the head-mounted display 10 according to the present disclosure has been described above. Next, with reference to FIG. 3 to FIG. 5, a configuration of the adjustment mechanism 200 of the head-mounted display 10 according to the present embodiment is described. FIG. 4 is a schematic diagram illustrating a structure of the adjustment mechanism 200 of the head-mounted display 10 according to the present embodiment. FIG. 5 is a schematic diagram illustrating a cross section taken along a plane parallel to a ZX plane in such a manner that the cross section includes the third protrusion 221 illustrated in FIG. 4.

The adjustment mechanism 200 adjusts the length of the perimeter of the head-mounted display 10 to the head circumference of the user. The adjustment mechanism 200 includes the belts and the plurality of elastic bodies, and may include the rail and the rail cover if necessary. For example, as illustrated in FIG. 3, the adjustment mechanism 200 includes the first belt 210, the second belt 220, the first elastic body 230, the second elastic body 240, the rail 250, and the rail cover 260. It is to be noted that, the wording "the length of the perimeter" described herein means the length of an inner surface of the head-mounted display 10 seen in a cross section taken along a plane parallel to the XY plane.

As illustrated in FIG. 3, the first elastic body 230 extends along the first belt 210. One end of the first elastic body 230 is fixed to the first belt 210, and another end of the first elastic body 230 is fixed to the rail 250 or a predetermined position in the rear block 300. The one end of the first elastic body 230 may be hooked on a hook part 213 provided on the first belt 210, for example. In addition, the other end of the first elastic body 230 may fit an end of the first guide part 251 (described later), for example. The rear block 300 or the rail 250 may include a plurality of parts to which the other end of the first elastic body 230 is attachable.

The first elastic body 230 is fixed to the first belt 210 and the rail 250, for example, in a state in which the first elastic body 230 is elongated by a predetermined length. In addition, as illustrated in FIG. 3, a portion of the first elastic body 230 may be disposed between, for example, the first belt 210 and the rail 250 so as to overlap the first belt 210. In addition, as illustrated in FIG. 3, the first elastic body 230 may be disposed so as to protrude from the one end of the first belt 210 in a direction in which the first belt 210 extends. It is possible to adjust an amount of elongation of the first elastic body 230 by changing an attachment position of the other end of the first elastic body 230.

Examples of material for the first elastic body 230 may include elastic deformation material such as rubber or a metal spring. Specifically, as the material for the first elastic body 230, it is possible to use natural rubber, isoprene rubber, silicone rubber, nitrile rubber, a steel spring, a non-ferrous metal spring, or the like. The silicone rubber is preferably used as the material for the first elastic body 230 in view of reliability such as thermostability and cold hardiness. Alternatively, for example, in a case where a metal coil spring is used as the material for the first elastic body 230, parameters such as a wire diameter, a coil diameter, and the number of turns of the coil may be appropriately adjusted depending on the design of the head-mounted display.

In addition, the first elastic body 230 is slidable on the rail 250. A surface of the first elastic body 230 that comes into contact with at least the rail 250 may be coated with the low friction material so that the first elastic body 230 slides smoothly on the rail 250. Examples of the low friction material include fluoropolymers.

As illustrated in FIG. 3, the second elastic body 240 extends along the second belt 220. One end of the second elastic body 240 is fixed to the second belt 220, and another end of the second elastic body 240 is fixed to the rail 250 or a predetermined position in the rear block 300. The one end of the second elastic body 240 is hooked on a hook part 223 provided on the second belt 220, for example. In addition, the other end of the second elastic body 240 may fit an end of the second guide part 252 (described later), for example. The rear block 300 or the rail 250 may include a plurality of parts to which the other end of the second elastic body 240 is attachable.

In addition, the second elastic body 240 is fixed to the second belt 220 and the rail 250, for example, in a state in which the second elastic body 240 is elongated by a predetermined length. A portion of the second elastic body 240 may be disposed between, for example, the second belt 220 and the rail 250 so as to overlap the second belt 220. In addition, as illustrated in FIG. 3, the second elastic body 240 may be disposed so as to protrude from the one end of the second belt 220 in a direction in which the second belt 220 extends. It is possible to adjust an amount of elongation of the second elastic body 240 by changing an attachment position of the other end of the second elastic body 240.

Examples of material for the second elastic body 240 may include elastic deformation material such as rubber or a metal spring. Specifically, as the material for the second elastic body 240, it is possible to use natural rubber, isoprene rubber, silicone rubber, nitrile rubber, a steel spring, a non-ferrous metal spring, or the like.

In addition, the second elastic body 240 is slidable on the rail 250. A surface of the second elastic body 240 that comes into contact with at least the rail 250 may be coated with the low friction material so that the second elastic body 240 slides smoothly on the rail 250. Examples of the low friction material include fluoropolymers.

It is to be noted that, when there is no need in particular to distinguish the first elastic body 230 from the second elastic body 240, the first elastic body 230 and the second elastic body 240 may be simply referred to as the elastic bodies hereinafter.

As illustrated in FIG. 5, the rail 250 may include the first guide part 251 and the second guide part 252. The first guide part 251 guides at least any of the first belt 210 or the first elastic body 230 to slide. The second guide part 252 guides at least any of the second belt 220 or the second elastic body 240 to slide.

The first guide part 251 and the second guide part 252 extend along a width direction of the rail 250, that is, a head circumference direction of the user. The first guide part 251 allows the first belt 210 to slide in the head circumference direction of the user more smoothly. The second guide part 252 allows the second belt 220 to slide in the head circumference direction of the user more smoothly. In addition, the first guide part 251 and the second guide part 252 allow the first elastic body 230 and the second elastic body 240 to be elongated in the head circumference direction of the user.

In addition, as illustrated in FIG. 4 and FIG. 5, the first guide part 251 and the second guide part 252 may be disposed in parallel on the rail 250 along the height direction of the user's head. Because the first guide part 251 and the second guide part 252 are disposed in parallel along the height direction of the user's head, the first guide part 251 and the second guide part 252 are disposed so as to extend from one end to another end of the internal space of the rear block 300 in the width direction (the head circumference direction of the user). This allows the first elastic body 230 and the second elastic body 240 to extend a region from the one end to the other end of the internal space of the rear block 300 in the width direction, if necessary, along the first guide part 251 and the second guide part 252, respectively. In addition, because the first guide part 251 and the second guide part 252 are disposed in parallel along the height direction of the user's head, the first belt 210 may have the length equal to the length of the second belt 220, and the first elastic body 230 may have the length equal to the length of the second elastic body 240. This makes it possible to equalize states of loads applied to the user's head. As a result, it is possible for the user to wear the head-mounted display 10 more comfortably.

In addition, it is possible to use same material for the first belt 210 and the second belt 220 because the first belt 210 may have the length equal to the length of the second belt 220. In addition, it is possible to use same material for the first elastic body 230 and the second elastic body 240 because the first elastic body 230 may have the length equal to the length of the second elastic body 240. As a result, it is possible to simplify the manufacturing process of the head-mounted display 10.

It is to be noted that a rail, which is a modification example of the rail 250, may include a guide part (not illustrated) in such a manner that it is possible for the first belt 210, the first elastic body 230, the second belt 220, and the second elastic body 240 to overlap each other at least partially in a central direction of the user's head. Such a rail may have a smaller length in the Z-axis direction in comparison with the rail 250.

The rail cover 260 is disposed so as to be opposed to the rail 250 across at least any of the first belt 210, the first elastic body 230, the second belt 220, or the second elastic body 240. The rail cover 260 has a first hole 261, a first engagement part 262, a second hole 263, a second engagement part 264.

The first hole 261 is made in such a manner that the first protrusion 211 provided on the first belt 210 is movable in the inside of the first hole 261. For example, as illustrated in FIG. 3 and FIG. 4, the first hole 261 is made in such a manner that the first hole 261 extends in a circumferential direction of the head-mounted display 10 (in the head circumference direction of the user). When the first belt 210 slides in a direction that allows the length of the perimeter of the head-mounted display 10 to increase (hereinafter simply referred to as a "stretching direction"), the first protrusion 211 abuts on a Y-axis-positive-direction-side inner surface of the first hole 261 (see FIG. 2). The first elastic body 230 is elongated when the first belt 210 slides in the stretching direction. The amount of elongation of the first elastic body 230 becomes maximum when the first protrusion 211 abuts on the Y-axis-positive-direction-side inner surface of the first hole 261. Even in a case where the amount of elongation of the first elastic body 230 becomes maximum, the first elastic body 230 remains in the inside of the rear block 300 without protruding from the internal space of the rear block 300.

The first engagement part 262 engages with the second protrusion 212 provided on the first belt 210. The first engagement part 262 is disposed at a side end of the rail cover 260. As illustrated in FIG. 4, the second protrusion 212 engages with the first engagement part 262 when the first belt 210 slides in a direction that allows the length of the perimeter of the head-mounted display 10 to decrease (hereinafter simply referred to as a "shrinking direction"). The first elastic body 230 is attached by being elongated by a predetermined length so that the second protrusion 212 is engaged with the first engagement part 262.

The second hole 263 is made in such a manner that the third protrusion 221 provided on the second belt 220 is movable in the inside of the second hole 263. For example, as illustrated in FIG. 3 and FIG. 4, the second hole 263 is made in such a manner that the second hole 263 extends in the circumferential direction of the head-mounted display 10 (in the head circumference direction of the user). When the second belt 220 slides in the direction that allows the length of the perimeter of the head-mounted display 10 to increase, the third protrusion 221 abuts on a Y-axis-negative-direction-side inner surface of the second hole 263 (see FIG. 2). The second elastic body 240 is elongated when the second belt 220 slides in the stretching direction. The amount of elongation of the second elastic body 240 becomes maximum when the third protrusion 221 abuts on the Y-axis-negative-direction-side inner surface of the second hole 263. Even in a case where the amount of elongation of the second elastic body 240 becomes maximum, the second elastic body 240 remains in the inside of the rear block 300 without protruding from the internal space of the rear block 300.

The second engagement part 264 engages with the fourth protrusion 222 provided on the second belt 220. The second engagement part 264 is disposed at a side end of the rail cover 260. As illustrated in FIG. 4, the fourth protrusion 222 engages with the second engagement part 264 when the second belt 220 slides in the shrinking direction. The second elastic body 240 is attached by being elongated by a predetermined length so that the fourth protrusion 222 is engaged with the second engagement part 264.

As described above, the maximum amount of elongation of the first elastic body 230 is defined when the first protrusion 211 abuts on one of the inner surfaces of the first hole 261, and the minimum amount of elongation of the first elastic body 230 is defined when the second protrusion 212 engages with the first engagement part 262. In addition, the maximum amount of elongation of the second elastic body 240 is defined when the third protrusion 221 abuts on one of the inner surfaces of the second hole 263, and the minimum amount of elongation of the second elastic body 240 is defined when the fourth protrusion engages with the second engagement part 264. As described above, it is possible for the rail cover 260 to define the amount of elongation of the elastic bodies.

It is to be noted that, a method of attaching the rail cover 260 to the rail 250 is not specifically limited. It is possible to use known methods as the method of attaching the rail cover 260 to the rail 250. For example, it is possible to attach the rail cover 260 to the rail 250 by fitting them to each other or it is possible to attach the rail cover 260 to the rail 250 by a screw. Alternatively, for example, it is possible to partially couple the rail 250 to the rail cover 260 by a hinge and to fit at least a portion of the rail cover 260 other than the portion coupled by the hinge to the rail 250. This makes it possible to fix the rail cover 260 to the rail 250.

3. DESIGN OF ADJUSTMENT MECHANISM

Next, with reference to FIG. 6 to FIG. 9, a method of designing the adjustment mechanism 200 of the head-mounted display 10 according to the present embodiment is described. FIG. 6 is a graph illustrating an example of a stress-strain relationship of rubber used as the elastic bodies. FIGS. 7A, 7B, and 7C are schematic diagrams for describing the method of designing the adjustment mechanism 200. FIG. 8 is a graph illustrating a load-extension relationship of an elastic body having a large Young's modulus. FIG. 9 is a graph illustrating a load-extension relationship of an elastic body having a small Young's modulus. Note that, FIG. 8 and FIG. 9 schematically illustrate cases where the Young's moduli are constant.

Described first is a background led the present inventors to invent the adjustment mechanism 200 of the head-mounted display 10 according to the present disclosure. Respective users have different head circumferences. Therefore, it is necessary for the head-mounted display to have customizable size that allows the head-mounted display to be wearable for any users including a user whose head circumference is small and a user whose head circumference is large. A head-mounted display that includes the adjustment mechanism adjusting the size of the head-mounted display 10 and using the load of an elastic body, such as rubber, as holding power to mount the head-mount display on the user's head needs to apply a load large enough to stably mount the head-mount display on the user's head to the user's head even in a case where the head-mounted display has a perimeter of any length. However, the elastic body, which may be rubber, for example, has a characteristic as illustrated in FIG. 6. For example, the strain ε of the elastic body increases as its stress σ gets larger, and the elastic body fractures when the stress σ or the strain ε reaches a fracture point P. Accordingly, for example, in a case where the rubber used for the head-mounted display is elongated to a vicinity of the fracture point P of the elastic body, the load applied to the user's head increases. Alternatively, in a case where an amount of elongation of the rubber is small, the load applied to the user's head decreases. Therefore, for example, in a case where a user with a large head circumference wears a conventional head-mounted display designed to be worn by a user with a small head circumference using holding power of an elastic body, a load applied to the user's head becomes larger than a case where such a head-mounted display is worn by the user with the small head circumference. As a result, the user with the large head circumference feels a pain on a wearing position on his/her head. This sometimes makes the user wearing the head-mounted display feel uncomfortable. In contrast, in a case where the user with the small head circumference wears a conventional head-mounted display designed to be worn by the user with the large head circumference using holding power of an elastic body, a load applied to the user's head sometimes become insufficient to mount the head-mounted display on his/her head. This sometimes hinders the user with the small head circumference from wearing the head-mounted display stably. Therefore, most of conventional head-mounted displays include an additional locking mechanism or retightening mechanism for adjusting its size to ensure its wearing stability.

Accordingly, the inventors of the present disclosure diligently researched adjustment mechanisms using elastic bodies and invented an adjustment mechanism that provides comfortable wearability and high convenience for users without using the retightening mechanism or the locking mechanism.

It is important for a head-mounted display that is to be worn using elastomeric force of an elastic body without using the retightening mechanism or the locking mechanism to include the elastic body in such a manner that a load that is enough to allow a user to comfortably wear the head-mounted display is generated in accordance with the head circumference of the user. To achieve such a head-mounted display, it is necessary to appropriately decide material for the elastic body of the adjustment mechanism, a cross-sectional area, a natural length, and an installed length of the elastic body. To decide the material for the elastic body, the cross-sectional area, the natural length, and the installed length of the elastic body, the following processes are performed in this order: (1) decide a maximum usage length of the elastic body; (2) decide the natural length of the elastic body; (3) decide the installed length; (4) decide a load corresponding to the installed length; and (5) decide a load corresponding to the maximum usage length.

(1) Decision of Maximum Usage Length of Elastic Body

First, as illustrated in FIG. 7A, a maximum usage length $l_U$ of the first elastic body 230 is set to the length from one end to another end of the internal space of the rear block 300 in the width direction. The maximum usage length $l_U$ is the maximum length of elongation of the elastic body to change the length of the perimeter of the head-mounted display 10. In a similar way, a maximum usage length $l_U$ of the second elastic body 240 is set to the length from the one end to the other end of the internal space of the rear block 300 in the width direction.

(2) Decision of Natural Length of Elastic Body

Next, a natural length $l_0$ of the elastic body is decided. The natural length $l_0$ of the elastic body is decided in such a manner that an elongation rate ε of the elastic body reaches a maximum allowable elongation rate $ε_P$ when the length of the elastic body reaches the maximum usage length $l_U$. Here, the elongation rate ε is a value that represents a ratio of the length of the elongated elastic body to the natural length $l_0$ of the elastic body in percentage. It is possible for a designer of the adjustment mechanism 200 to freely set the maximum allowable elongation rate $ε_P$ as long as the elongation rate of the elastic body allows a load enough to provide the user with comfortable wearability to be applied on the user's head. For example, the natural length $l_0$ of the elastic body is $l_U×(100/250)$ in a case where the maximum allowable elongation rate $ε_P$ of the elastic body is 250% when the length of the elastic body reaches the maximum usage length $l_U$.

It is to be noted that the maximum allowable elongation rate $ε_P$ of the elastic body is preferably no more than half of a maximum elongation rate $ε_M$ that is a ratio of the length (maximum length $l_M$) of the elastic body immediately before fracture to the natural length $l_0$ of the elastic body. The maximum elongation rate $ε_M$ varies depending on the material for the elastic body. For example, in a case where the material for the elastic body is natural rubber or isoprene rubber, its general maximum elongation rate $ε_M$ is about 1000%. Accordingly, its maximum allowable elongation rate $ε_P$ is preferably set to 500% or less. In a case where the material for the elastic body is silicone rubber, its general maximum elongation rate $ε_M$ is about 500%. Accordingly, its maximum allowable elongation rate $ε_P$ is preferably set to 250% or less. Alternatively, in a case where the material for the elastic body is nitrile rubber, its general maximum elongation rate $ε_M$ is about 800%. Accordingly, its maximum allowable elongation rate $ε_P$ is preferably set to 400% or less.

(3) Decision of Installed Length

Next, an installed length $l_I$ of the elastic body is decided. The installed length $l_I$ is obtained by subtracting a movable amount E from the maximum usage length $l_U$ ($l_U$–E). The movable amount E is set in advance in designing the head-mounted display 10. It is to be noted that the head-mounted display 10 has a minimum perimeter when the length of the elastic body is the installed length h.

(4) Decision of Load Corresponding to Installed Length

As illustrated in FIG. 7B, the elastic body has the installed length $l_I$ in a state in which the elastic body is elongated by a predetermined amount from the natural length $l_0$. The elastic body of the installed length $l_I$ is fixed to the first belt 210 and the rail 250, and is accommodated in the internal space of the rear block 300. When the elastic body has the installed length $l_I$ (in other words, when the elastic body is elongated by $l_I$–$l_0$), the load should allow the user to stably wear the head-mounted display 10 on his/her head. When the load that allows the user to stably wear the head-mounted display 10 on his/her head is assumed to be a minimum necessary load $L_m$, the material for the elastic body and a cross-sectional shape of the elastic body are decided in such a manner that the load of the elastic body is the minimum necessary load $L_m$ when the elastic body has the installed length $l_I$. It is to be noted that, the minimum necessary load $L_m$ is calculated depending on the mass of the head-mounted display 10, material for the front pad 120, material for the rear pad 310, or the like. As an example, the minimum necessary load $L_m$ may be 6N.

(5) Decision of Load Corresponding to Maximum Usage Length

When the material for the elastic body and the cross-sectional shape of the elastic body are decided through the above-described processes, a load corresponding to the elastic body of the maximum usage length $l_U$ is decided. In a case where the load corresponding to the elastic body of the maximum usage length $l_U$ exceeds a maximum allowable load $L_P$ that is a load obtained when the elongation rate ε is the maximum allowable elongation rate $ε_P$, the size of the rear block 300 is increased or the material for the elastic body is replaced by material having a larger maximum elongation rate $ε_M$, and then the above-described processes (1) to (5) are performed again. The above-described processes make it possible to design the adjustment mechanism 200 in such a manner that the load corresponding to the elastic body of the maximum usage length $l_U$ is the maximum allowable load $L_P$ or less. Accordingly, it is possible to adjust the perimeter of the head-mounted display 10 to be larger than the head circumference of the user by extending the first belt 210 and the second belt 220 depending on the head circumference of the user. In addition, it is possible for the user to wear the head-mounted display 10 on his/her head by shrinking the elastic bodies. As described above, a user interface for wearing the head-mounted display 10 is simple, and this makes it possible for the user to wear the head-mounted display 10 more easily. In addition, it is also possible for the user to wear the head-mounted display 10 comfortably without feeling discomfort such as pain on his/her head even in a case of wearing the head-mounted display 10 having the maximum perimeter. In addition, it is also possible for the user to stably wear the head-mounted display 10 even in a case of wearing the head-mounted display 10 having the minimum perimeter.

As illustrated in FIG. 7A, it is possible for the elastic bodies of the adjustment mechanism 200 designed through the above-described processes to extend the region from the one end to the other end of the internal space of the rear block 300 in the width direction if necessary. As a result, it is possible to adjust the size of the head-mounted display 10 to a size corresponding to a head circumference of each user.

In addition, material having a small Young's modulus is preferably used for the elastic bodies. In a case where material having a large Young's modulus is used for the elastic bodies, a load corresponding to a head-mounted display having a maximum perimeter increases as illustrated in FIG. 8. Therefore, the load corresponding to the elastic body of the maximum usage length $l_U$ exceeds the maximum allowable load $L_P$. As a result, in a case where the user having the large head circumference wears such a head-mounted display, a large load is applied to the user's head, and its wearing stability may deteriorate. In contrast, in a case where the material having the small Young's modulus is used for the elastic body, a difference between a load corresponding to the head-mounted display 10 having the minimum perimeter and a load corresponding to the head-mounted display 10 having the maximum perimeter is small as illustrated in FIG. 9. In other words, when the material having the small Young's modulus is used for the elastic body, it is possible to suppress an amount of increase in a load corresponding to an amount of elongation from the installed length $l_I$ to the maximum usage length $l_U$. As a result, the head-mounted display 10 is stably worn by the user having the small head circumference. In addition, even in a case of the user having the large head circumference wears the head-mounted display 10, it is possible to maintain good comfortableness of wearing the head-mounted display 10 without applying a large load on the user's head.

In addition, as described above, the first guide part 251 and the second guide part 252 may be disposed in parallel on the rail 250 along the height direction of the user's head. This allows the first elastic body 230 and the second elastic body 240 to be elongated from the one end to the other end of the internal space of the rear block 300 in the width direction along the first guide part 251 and the second guide part 252, respectively. This makes it possible to set a longer installed length $l_I$ of the elastic body corresponding to the minimum necessary load $L_m$ in a case where the movable amounts E of the first belt 210 and the second belt 220 are constant. This results in a larger difference between the installed length $l_I$ and the natural length $l_0$, and the minimum necessary load $L_m$ is generated in a case where the elastic body has the installed length $l_I$ in a state in which the elastic body is elongated from the natural length $l_0$. As a result, it is possible to use the material having the small Young's modulus for the elastic body.

In addition, in a case where a spring is used for the elastic body, it is possible to design the spring by adjusting material for the spring, the wire diameter, the coil diameter, the number of turns of the coil, or the like in such a manner that the minimum necessary load $L_m$ is generated when the elastic body has the installed length $l_I$ and that the maximum allowable load $L_P$ is generated when the elastic body has the maximum usage length $l_U$.

As described above, according to the present disclosure, it is possible to achieve a more comfortable wearing state for the users more easily. In addition, because the adjustment mechanism is designed through the above-described method, it is possible for the head-mounted display 10 according to the present embodiment to apply an appropriate tightening load to the user's head when the user just wears the head-mounted display 10. As a result, it is possible for the user to wear the head-mounted display 10 through the simple operation. In addition, the above-described adjustment mechanism makes it possible to omit the retightening mechanism and the locking mechanism that are installed in a conventional head-mounted displays. As a result, it is possible to provide the head-mounted display 10 with a simple structure according to the present embodiment. In addition, the mechanism for adjusting the length of the head-mounted display 10 does not influence the appearance of the head-mounted display 10. This allows the head-mounted display 10 to have a good design. In addition, because the head-mounted display 10 has the simple structure, it is possible to reduce the number of parts and reduce its manufacturing cost.

The method of designing the adjustment mechanism 200 has been described above. Next, details of the rear pad 310 installed on the rear block 300 are described.

4. PAD MEMBER (4.1. Background)

In general, the head-mounted display is required to be stably worn on the head of a user. In recent years, a head-mounted display that provides good wearability for users has been further desired. For example, a head-mounted device including a counterweight disposed on the back side of the user's head has been known. The counterweight has a sac-like shape in which metallic balls or liquid is enclosed. In addition, for example, head-mounted equipment including a pressing force generation mechanism disposed on a temporal side and the back side of the user's head has been known.

However, because a plurality of the metallic balls or liquid is enclosed in the inside of the counterweight, the head-mounted device has large mass. Sometimes this prohibits the user who wears the head-mounted device from feeling the good wearability. In addition, the above-described head-mounted equipment has a complicated mechanism. Therefore, such head-mounted equipment may require complicated manufacturing processes and high manufacturing cost. As described above, the existing head-mounted displays still have room for improvement.

Accordingly, the inventors of the present technology diligently researched the pad member installed in the head-mounted display. As a result, the inventors of the present technology invented a head-mounted display that provides better wearability with a simpler structure.

According to the present disclosure, there is provided a head-mounted display including a pad member. The pad member includes a projection on its opposing surface to be opposed to the back side of the user's head, and the projection abuts on the user's head in a region other than a region corresponding to a backmost part of the user's head.

According to the present disclosure, it is possible to provide better wearability with the simpler structure.

(4.2. Structure of Pad Member)

Details of the rear pad 310 installed on the rear block 300 are described with reference to FIG. 10 to FIG. 12. FIG. 10 is a schematic diagram illustrating a pad member according to an embodiment of the present disclosure when seen from the X-axis direction. FIG. 11 is a schematic diagram illustrating a pad member provided with projections whose position or structure is different according to the present embodiment when seen from the X-axis direction. FIG. 12 is a schematic diagram illustrating a pad member provided with a projection whose position or structure is different according to the present embodiment when seen from the X-axis direction.

The rear pad 310 includes a projection on its opposing surface to be opposed to the back side of the user's head. The projection abuts on the user's head in a region other than a region corresponding to a backmost part of the user's head. In a case where the rear pad includes no projection but the entire rear pad has cushioning characteristics, a load applied to the user's head in the region on the rear pad that abuts on the backmost part of the user's head is larger than a load applied to the user's head in a region on the rear pad that abuts on a part of the user's head other than the backmost part. However, it is possible for the user to stably wear the head-mounted display 10 on his/her head regardless of the size, shape, or the like of the user's head because the projection is provided in the region other than the region corresponding to the backmost part of the user's head on the opposing surface to be opposed to the back side of the user's head. For example, as illustrated in FIG. 10, the rear pad 310 may be provided with four projections 320. Because the rear pad 310 is provided with the four projections 320, it is possible to stably wear the head-mounted display 10 on the user's head. Because the head-mounted display 10 is stably worn on the user's head, it is possible to reduce variability in the tightening load to be applied to the user's head. As a result, it is possible for the user to wear the head-mounted display 10 with good wearability.

In addition, the four projections 320 each have a centroid passing through the region corresponding to the backmost part of the user's head and provided at a position substantially symmetric about the X axis as illustrated in FIG. 10. The four projections 320 may each have a centroid passing through the region corresponding to the backmost part of the user's head and provided at a position symmetric about the X axis.

For example, as illustrated in FIG. 11, the rear pad 310 may be provided with three projections 320. Alternatively, for example, as illustrated in FIG. 12, the rear pad 310 may be provided with a ring-like projection 321. In a way similar to the centroid of the four projection 320 illustrated in FIG. 10, the three projections 320 illustrated in FIG. 11 and the ring-like projection 321 illustrated in FIG. 12 each have a centroid passing through the region corresponding to the backmost part of the user's head and provided at a position substantially symmetric about the X axis. Because the projections 320 or the projection 321 of the rear pad 310 is disposed as described above, the head-mounted display 10 is stably worn on the user's head in comparison with a head-mounted display including a rear pad provided with no projection.

It is to be noted that, as illustrated in FIG. 12, the ring-like projection 321 has a hollow in a predetermined region including its centroid. In addition, although FIG. 12 illustrates the ring-like projection that is a perfect circle, the ring-like projection 321 is not limited to the toric projection as long as the projection has a hollow in the predetermined region including its centroid. For example, the ring-like projection may be a ring-like projection having various kinds of shapes such as a ring-like projection having an elliptical shape or a ring-like projection having a polygonal shape.

Next, with reference to FIG. 13, a configuration of the rear pad 310 is described. FIG. 12 is a schematic diagram illustrating a cross section of the pad member according to the present embodiment, the cross section being taken along a line A-A of FIG. 10.

As illustrated in a left diagram in FIG. 13, the rear pad 310 according to the present embodiment may include an adhesive member 311, a cushion member 312, and a cover member 313.

The adhesive member 311 is a member that bonds the rear block 300, the cushion member 312, and the cover member 313 to each other. For example, liquid adhesive, adhesive paper with both surfaces being applied with an adhesive, or the like is used for the adhesive member 311.

The cushion member 312 includes, for example, foamable resin. Specifically, foamable urethane resin may be used. It is to be noted that material used for the cushion member 312 is not limited to the foamable urethane resin. Felt, rubber, or polyester fiber may be used.

The cover member 313 may be disposed on a surface of the cushion member 312 other than a surface bonded to the rear block 300. The cover member 313 includes, for example, foamable resin. Specifically, foamable urethane resin may be used. It is to be noted that material used for the cover member 313 is not limited to the foamable urethane resin. Felt, rubber, or polyester fiber may be used.

The cover member 313 may be formed through various kinds of known forming method by using a mold corresponding to the projection 320, for example. The cushion member 312 may be formed on a surface of the formed cover member 313 through various kinds of known methods. The surface is opposite to a surface that comes into contact with the user's head. In this case, material that does not deform or get damaged when forming the cushion member 312 is preferably used for the cover member 313. Examples of the material for the cover member 313 include foamable urethane resin. Alternatively, the cushion member 312 may be formed by using a mold corresponding to the shape of the cover member 313. The cushion member 312 formed by using the mold corresponding to the shape of the cover member 313 may be bonded to the surface of the cover member 313 that does not come into contact with the user's head, with various kinds of known adhesive.

The cover member 313 and the cushion member 312 are bonded to the user's head side of the rear block 300 with the adhesive member 311.

The rear block includes the above-described rear pad 310. This allows the head-mounted display 10 to have a simpler structure. In addition, it is possible to save the weight of the rear pad 310 because resin that is lightweight material is used for the cushion member 312 and the cover member 313. As a result, the head-mounted display 10 may have better wearability.

In addition, a rear pad 314 illustrated in a middle diagram in FIG. 13 may include the adhesive member 311 and the cushion member 312.

The rear pad 314 is different from the rear pad 310 in that the rear pad 314 does not include the cover member 313. The cushion member 312 of the rear pad 314 is disposed in such a manner that the cushion member 312 comes into contact with the user's head. The rear pad 314 does not include the cover member 313. This makes it possible to simplify the manufacturing process of the rear pad 314 and reduce the manufacturing cost.

In addition, a rear pad 315 illustrated in a right diagram in FIG. 13 may include the adhesive member 311, a cushion member 316, a cushion member 317, and the cover member 313. The cushion member 317 has hardness that is different from hardness of the cushion member 316. The cushion member 316 and the cushion member 317 include, for example, foamable resin. Specifically, foamable urethane resin may be used. It is to be noted that material used for the cushion member 316 and the cushion member 317 is not limited to the foamable urethane resin. Felt, rubber, or polyester fiber may be used.

The rear pad 315 is different from the rear pad 310 in that the rear pad 315 includes the plurality of cushion members having different hardnesses. The rear pad 315 may include the cushion member 316 having a predetermined hardness and the cushion member 317 having a smaller hardness than the cushion member 316. The cushion member 316 is used for the projection 320, and the cushion member 317 is used for a part other than the projection 320, for example. As a result, it is possible for the head-mounted display 10 including the rear pad 315 to provide more comfortable wearability for the user regardless of the size or the shape of the user's head. In addition, it is also possible to omit the cushion member 317 if the projection 320 is enough to support the user's head.

Next, with reference to FIG. 14, shapes of the projection 320 are described. FIG. 14 is a schematic diagram for describing the shapes of projections according to the present embodiment.

Because the rear pad 310 is configured as described above, the projection provided on the rear pad 310 is deformable depending on the shape of the user's head. Therefore, the rear pad 310 may include, for example, a projection 322 whose cross section is semicircular, a projection 323 whose cross section is rectangular, or a projection 324 whose cross section corresponds to the user's head when the cross sections are parallel to ZX planes of the projections as illustrated in FIG. 14. Accordingly, the projection provided on the rear pad 310 may have a hemispherical shape, a cylindrical shape, an elliptic cylindrical shape, a prism shape, a circular truncated cone shape, an elliptical truncated cone shape, or a truncated pyramid shape, for example.

It is possible for the head-mounted display 10 including the above-described rear pad 310 according to the present embodiment to provide the comfortable wearing state for the user by using the simpler structure.

5. CONCLUSION

As described above, according to the present disclosure, it is possible to provide the head-mounted display that provides comfortable wearability and higher convenience for the user.

The details of the preferred embodiments of the present disclosure have been described above with reference to the accompanying drawings, whilst the present technology is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

Further, the effects described herein are merely illustrative or exemplary, and are not limitative. That is, the technique according to the present disclosure may achieve, in addition to or in place of the above effects, other effects that are obvious to those skilled in the art from the description of the present specification.

It is to be noted that the present technology may also have the following configurations.

(1) A head-mounted display including:
a front block that supports a display unit to be disposed in front of an eye of a user;
a rear block that is to be disposed on a back side of a head of the user; and
a plurality of elastic bodies that extends along a belt for linking the front block to the rear block,
each of the plurality of elastic bodies having one end that is fixed to the belt and another end that is fixed to a predetermined position in the rear block.

(2) The head-mounted display according to (1), in which the rear block includes a rail along which the belt and the plurality of elastic bodies slide.

(3) The head-mounted display according to (2), in which the rear block further includes a rail cover that is opposed to the rail across at least the belt or any of the plurality of elastic bodies, the rail cover defining an amount of elongation of the elastic bodies.

(4) The head-mounted display according to (3), in which the belt includes
a first belt that links one end of the front block to an end of the rear block corresponding to the one end of the front block, and
a second belt that links another end of the front block to another end of the rear block in such a manner that the second belt is opposed to the first belt,
among the plurality of elastic bodies, a first elastic body has one end that is fixed to the first belt,
among the plurality of elastic bodies, a second elastic body has one end that is fixed to the second belt, the second elastic body being different from the first elastic body, and
the rail cover is opposed to the rail across at least any of the first belt, the first elastic body, the second belt, or the second elastic body, the rail cover defining an amount of elongation of the first elastic body and an amount of elongation of the second elastic body.

(5) The head-mounted display according to (4), in which
a rail-cover-side surface of the first belt includes
a first protrusion provided at an end of the first belt, and
a second protrusion provided at a position to which the first elastic body is fixed,
a rail-cover-side surface of the second belt includes
a third protrusion provided at an end of the second belt, and
a fourth protrusion provided at a position to which the second elastic body is fixed, and
the rail cover has
a first hole that allows the first protrusion to move therein,
a first engagement part that engages with the second protrusion,
a second hole that allows the third protrusion to move therein, and
a second engagement part that engages with the fourth protrusion.

(6) The head-mounted display according to (5), in which
a maximum amount of elongation of the first elastic body is defined when the first protrusion abuts on one of inner surfaces of the first hole,
a minimum amount of elongation of the first elastic body is defined when the second protrusion engages with the first engagement part,
a maximum amount of elongation of the second elastic body is defined when the third protrusion abuts on one of inner surfaces of the second hole, and
a minimum amount of elongation of the second elastic body is defined when the fourth protrusion engages with the second engagement part.

(7) The head-mounted display according to any one of (4) to (6), in which
the rail includes
a first guide part that guides at least any of the first belt or the first elastic body to slide, and
a second guide part that guides at least any of the second belt or the second elastic body to slide, and
the first guide part and the second guide part are disposed in parallel on the rail along a height direction of the head of the user.

(8) The head-mounted display according to any one of (4) to (7), in which the first elastic body and the second elastic body are accommodated in an inside of the rear block.

(9) The head-mounted display according to any one of (1) to (8), in which
the rear block further includes a pad member on side of the head of the user, and the pad member includes a projection on an opposing surface of the pad member to be opposed to the back side of the head of the user, the projection abutting on the head of the user in a region other than a region corresponding to a backmost part of the head of the user.

(10) The head-mounted display according to (9), in which the pad member includes a plurality of the projections, the plurality of the projections each have a centroid passing through the region corresponding to the backmost part of the head of the user and provided substantially symmetric about an axis in a direction from the front block to the rear block.

(11) The head-mounted display according to (9) or (10), in which the projection of the pad member comprises four projections.

(12) The head-mounted display according to (9) or (10), in which the projection has a ring-like shape.

REFERENCE SIGNS LIST

10: head-mounted display
100: front block
200: adjustment mechanism
210: first belt
211: first protrusion
212: second protrusion
220: second belt
221: third protrusion
222: fourth protrusion
230: first elastic body
240: second elastic body
250: rail
260: rail cover
261: first hole
262: first engagement part
263: second hole
264: second engagement part
300: rear block
310, 314, 315: rear pad
311: adhesive member
312, 316, 317: cushion member
313: cover member
320, 321, 322, 323, 324: projection

The invention claimed is:

1. A head-mounted display, comprising:
a front block that supports a display unit to be disposed in front of an eye of a user;
a rear block that is to be disposed on a back side of a head of the user, wherein
the rear block includes a pad member on a side of the head of the user,
the pad member includes a projection on an opposing surface of the pad member to be opposed to the back side of the head of the user, and
in a case where the rear block is disposed on the back side of the head of the user, the projection abuts on the head of the user in a region different from a region corresponding to a backmost part of the head of the user;
a belt that links the front block to the rear block; and
a plurality of elastic bodies that extends along the belt that links the front block to the rear block,
wherein each of the plurality of elastic bodies has a first end that is fixed to the belt and a second end that is fixed to a specific position in the rear block.

2. The head-mounted display according to claim 1, wherein the rear block further includes a rail along which the belt and the plurality of elastic bodies slide.

3. The head-mounted display according to claim 2, wherein
the rear block further includes a rail cover that is opposed to the rail across at least one of the belt or one of the plurality of elastic bodies, and
the rail cover defines an amount of elongation of the plurality of elastic bodies.

4. The head-mounted display according to claim 3, wherein
the belt includes
a first belt that links a first end of the front block to a first end of the rear block corresponding to the first end of the front block, and
a second belt that links a second end of the front block to a second end of the rear block in such a manner that the second belt is opposed to the first belt,
among the plurality of elastic bodies, a first elastic body has one end that is fixed to the first belt,
among the plurality of elastic bodies, a second elastic body has one end that is fixed to the second belt,
the second elastic body is different from the first elastic body,
the rail cover is opposed to the rail across at least one of the first belt, the first elastic body, the second belt, or the second elastic body, and
the rail cover defines an amount of elongation of the first elastic body and an amount of elongation of the second elastic body.

5. The head-mounted display according to claim 4, wherein
a rail-cover-side surface of the first belt includes
a first protrusion at an end of the first belt, and
a second protrusion at a position to which the first elastic body is fixed,
a rail-cover-side surface of the second belt includes
a third protrusion at an end of the second belt, and
a fourth protrusion at a position to which the second elastic body is fixed, and
the rail cover has
a first hole that allows the first protrusion to move therein,
a first engagement part that engages with the second protrusion,
a second hole that allows the third protrusion to move therein, and
a second engagement part that engages with the fourth protrusion.

6. The head-mounted display according to claim 5, wherein
a maximum amount of elongation of the first elastic body is defined in a case where the first protrusion abuts on one of inner surfaces of the first hole,
a minimum amount of elongation of the first elastic body is defined in a case where the second protrusion engages with the first engagement part,
a maximum amount of elongation of the second elastic body is defined in a case where the third protrusion abuts on one of inner surfaces of the second hole, and
a minimum amount of elongation of the second elastic body is defined in a case where the fourth protrusion engages with the second engagement part.

7. The head-mounted display according to claim 4, wherein
the rail includes a first guide part that guides at least one of the first belt or the first elastic body to slide, and a second guide part that guides at least one of the second belt or the second elastic body to slide, and the first guide part and the second guide part are in parallel on the rail along a height direction of the head of the user.

8. The head-mounted display according to claim 4, wherein the first elastic body and the second elastic body are in an inside of the rear block.

9. The head-mounted display according to claim 1, wherein the pad member further includes a plurality of projections, the plurality of projections includes the projection, each of the plurality of projections has a centroid that passes through the region corresponding to the backmost part of the head of the user and is at a position substantially symmetric about an axis in a direction from the front block to the rear block.

10. The head-mounted display according to claim 1, wherein the projection of the pad member comprises four projections.

11. The head-mounted display according to claim 1, wherein the projection has a ring-like shape.

12. A head-mounted display, comprising:

a front block that supports a display unit to be disposed in front of an eye of a user;

a rear block that is to be disposed on a back side of a head of the user;

a first belt that links a first end of the front block to a first end of the rear block corresponding to the first end of the front block;

a second belt that links a second end of the front block to a second end of the rear block in such a manner that the second belt is opposed to the first belt;

a first elastic body that has a first end fixed to the first belt and a second end fixed to a first position in the rear block; and a second elastic body that has a first end fixed to the second belt and a second end fixed to a second position in the rear block, wherein the second elastic body is different from the first elastic body, the rear block includes:

a rail along which the first belt, the second belt, the first elastic body, and the second elastic body slide, and a rail cover that is opposed to the rail across at least one of the first belt, the first elastic body, the second belt, or the second elastic body, the rail cover defines an amount of elongation of the first elastic body and an amount of elongation of the second elastic body, and the first elastic body and the second elastic body are in an inside of the rear block.

\* \* \* \* \*